Oct. 13, 1931. A. H. GROSZ 1,826,775
ELECTRIC METER PROTECTOR
Filed Dec. 22, 1927 2 Sheets-Sheet 1
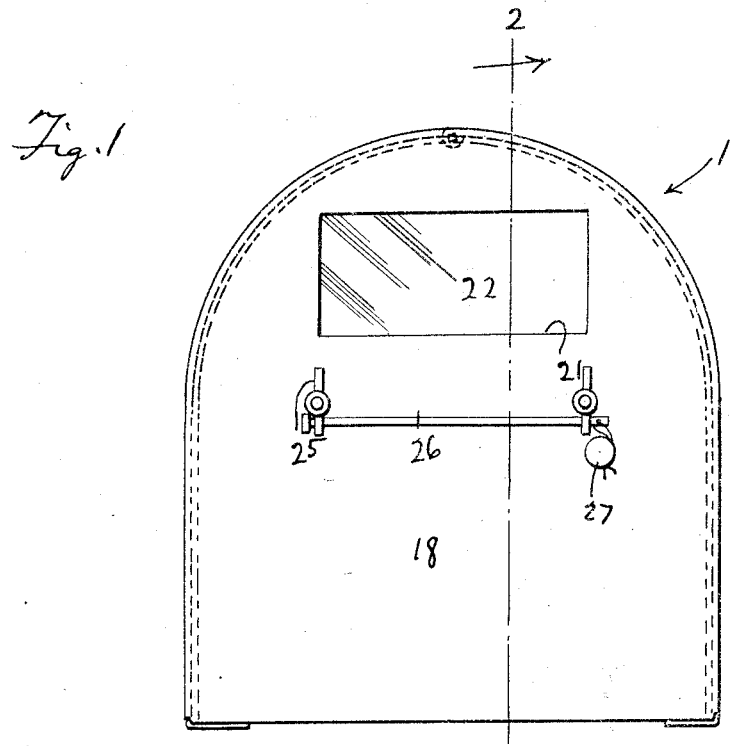
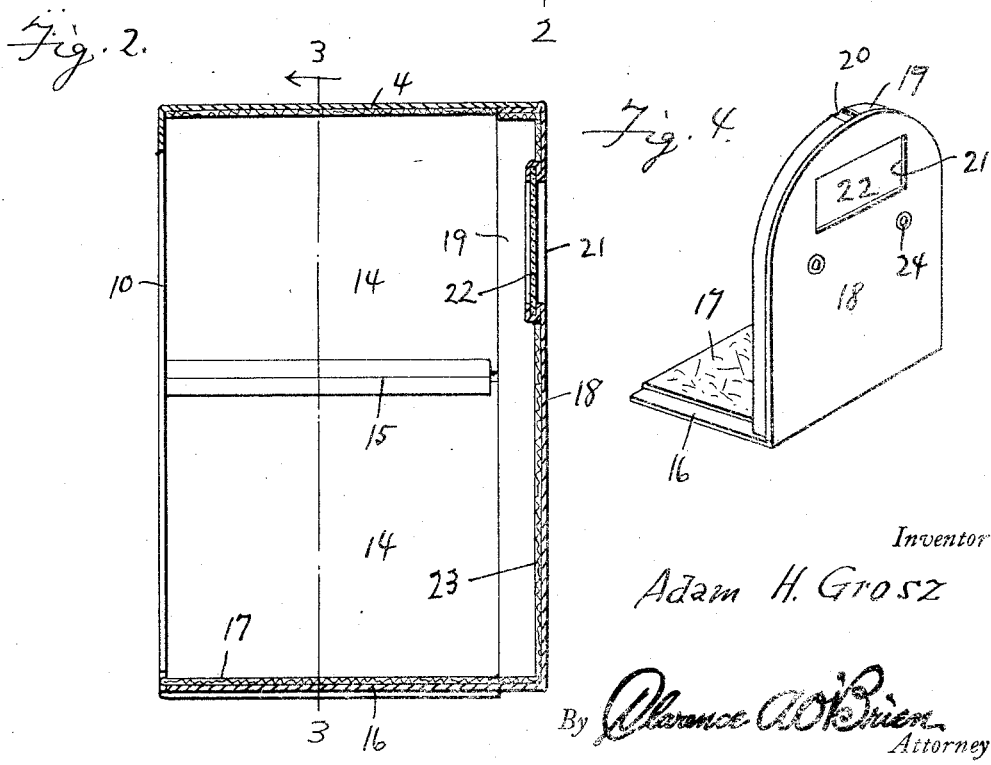
Inventor
Adam H. Grosz Oct. 13, 1931.   A. H. GROSZ   1,826,775
ELECTRIC METER PROTECTOR
Filed Dec. 22, 1927   2 Sheets-Sheet 2
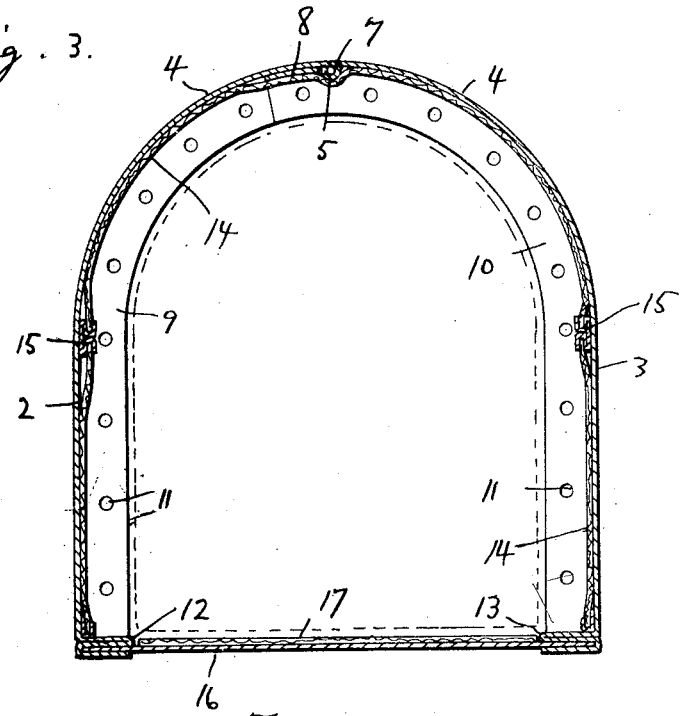
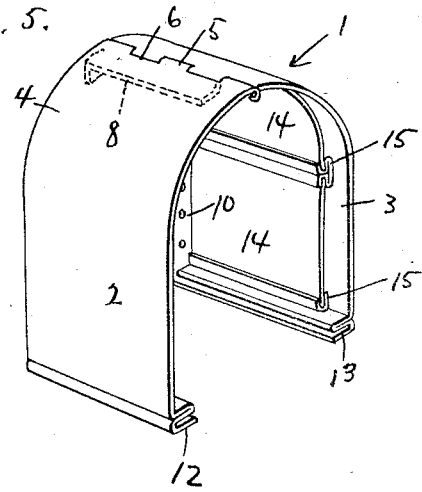
Inventor
Adam H. Grosz
By Clarence A. O'Brien
Attorney Patented Oct. 13, 1931

1,826,775

UNITED STATES PATENT OFFICE

ADAM H. GROSZ, OF NEW ORLEANS, LOUISIANA

ELECTRIC METER PROTECTOR

Application filed December 22, 1927. Serial No. 241,991.

The present invention relates to an electric meter protecting device and has reference more particularly to a box or casing for receiving the usual meter mechanism that is employed in conjunction with electric lighting and heating systems.

One of the important objects of the present invention is to provide an electric member protector which will house the meter in such a manner as to prevent current theft or tampering with the meter, and at the same time protecting the meter from the accumlation of dirt and other foreign substances.

A further object of the invention is to provide an electric meter protector of the above mentioned character which is of such construction as to prevent the same to be readily and easily installed in position over the meter and secured thereon during the installation of the meter, a seal being employed to lock the casing on the meter.

A further object is to provide an electric meter protector wherein the casing is of such construction as to readily indicate when an attempt has been made to disrupt the casing and obtain access to the meter for purloining current.

A further object is the provision of an electric meter protector comprising a casing, and a peculiar and advantageous lining in the casing.

A still further object is to provide an electric meter protector which is simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate corresponding parts throughout the several views:

Figure 1 is a front elevation of the protector embodying my invention showing the same sealed.

Figure 2 is a vertical section taken substantially on the line 2—2 of Figure 1 looking in the direction of the arrows.

Figure 3 is a section taken on the line 3—3 of Figure 2.

Figure 4 is a detail perspective view of the removable front side and bottom forming portion associated therewith.

Figure 5 is a detail perspective view of the casing, the front and bottom being removed to more clearly disclose the arrangement of the asbestos pad on the inside of the casing.

In the drawings wherein for the purpose of illustration is shown the preferred embodiment of my invention, the numeral 1 designates generally the casing comprising my improved electric meter protector, the same including the side walls 2 and 3 respectively, the same being formed of metal. The upper edge portions of these side walls are curved inwardly as illustrated at 4 with reference more particularly to Figures 3 and 5 of the drawings, and the adjacent edges of the curved upper ends of the side walls are formed with interfitting loops 5 and 6, respectively, through which extends the rod 7 whereby a hinged connection is provided between the inwardly curved upper edges of the side walls and furthermore the upper curved edges of the side walls form a rounded top for the casing. A portion of the upper edge of the side wall 3 extends beneath the curved upper edge of the complementary side wall as is shown in the dotted lines in Figure 5 and this laterally extending portion is denoted by the numeral 8. The rear edge of each of the side walls is bent inwardly to form the flanges 9 and 10, respectively and each flange is formed with a series of openings 11 to facilitate the attachment of the casing to the wall by any appropriate fastening means being driven through these openings 11 into the wall.

The lower edge of each of the side walls is so bent as to form the cooperating guide channels 12 and 13, respectively which extend for the full depth of the casing and the purpose of these guide channels will be hereinafter more fully described.

The inside of the casing 1 is lined with removable asbestos pads such as are shown at 14, suitable metallic holders in the form of guides 15 being secured on the inner faces of the sides of the casing and extending transversely thereof for receiving the edges of the pads as clearly illustrated in Figures 3 and 5.

The asbestos pads cover the entire inner face of each side with the exception of the forward edge portion and this is also clearly shown in Figure 5 of the drawings. It will also be noted that the crown pad 14 is arched and has its end portion held in the upper holder 15; also, that by virtue of the holder 15 the pads 14 are strongly maintained in proper position, and that the guide form of the holders lends itself to expeditious and easy placing of the pads in the casing.

A metallic bottom forming plate 16 is slidable between the cooperating guide channels 12 and 13 as shown very clearly in Figure 3, and this plate is of substantially the same width as the casing. An asbestos pad 17 is secured on the upper face of this bottom forming plate. The front wall 18 of the casing is preferably formed integrally with the forward edge portion of the bottom forming plate 16, and as is clearly shown in Figure 4, the upper portion of the front wall is rounded to cooperate with the rounded top of the casing formed by the inwardly curved upper edges 4 of the respective side walls.

The edge portions of the front wall are bent to form an inwardly directed flange 19 that fits within the front open side of the casing and snugly engages the inner faces of the sides and top of the casing. The inner edge of the flange is adapted to abut the forward edges of the asbestos pads 14 that are supported against the inner faces of the sides of the casing, and this is more clearly disclosed in Figure 2 of the drawings.

The flange is further formed with a depression 20 in the top portion thereof for accommodating the forwardmost looped portion of the hinge connection between the upper edges of the side walls, when the removable front wall and bottom forming plate are positioned within the casing. Furthermore, the edge portions of the front wall will engage the forward edges of the side walls and top of the casing.

The front wall is preferably provided with a window opening 21, in which is fitted a transparent closure constructed of glass, celluloid or the like, and which is designated by the numeral 22, for permitting a reading of the meter and an inspection of the disc rotation without necessitating the removal of the front section of the casing.

The front section or wall 18 is lined with asbestos 23 on its inner face and the inwardly directed flange 19 is also lined with asbestos.

The front wall 18 is further formed with the spaced openings 24 for accommodating the threaded ends of the bolts that extend from the front of the meter (not shown) and usual wing nuts 25 are threaded on the outer ends of these bolts.

Each wing nut is provided with an opening and when said wing nuts are disposed so that the openings are in registration, a headed bar or bolt 26 extends therethrough. The head of the bolt will engage one of the wing nut while a seal 27 is fastened on the other end of the bolt whereby the meter casing cannot be removed without breaking the seal and removing the bolt from the wing nuts.

The provision of a casing of the character shown and above described will provide a means for protecting an electric meter against being tampered with and should any attempt be made to purloin current, it will of course be necessary to drill through the casing or otherwise disrupt the same in order to obtain access to the meter, and such attempts by unauthorized persons to reach the meter will be readily noticeable upon inspecting the casing and the asbestos lining on the inside thereof.

An electric meter protector casing of the present character will furthermore protect the meter against accumulation of dirt and other substance and also due to its simplicity of construction, the casing can be readily and easily assembled or disassembled and without necessitating any material alterations of the meter with which the protector is to be associated.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. In an electric meter protector, a casing comprising a pair of side walls, a top, a removable bottom forming plate, guide channels on the lower edges of the side walls for receiving the respective edges of the bottom forming plate to support said plate, a front wall extending upwardly from the forward edge portion of the bottom forming plate, and an inwardly directed flange formed on the front wall for engagement with the inner faces of the sides and top of the casing.

2. In an electric meter protector, a casing comprising a pair of side walls, a top, a removable bottom forming plate, guide channels on the lower edges of the side walls for receiving the respective edges of the bottom forming plate to support said plate, a front wall extending upwardly from the forward edge portion of the bottom forming plate, an inwardly directed flange formed on the front wall for engagement with the inner faces of the sides and top of the casing, and a lining on the inner face of the sides, top, bottom and front walls of the casing.

3. In an electric meter protector, a casing comprising a pair of side walls, the upper ends thereof being curved inwardly and secured together at their adjacent edges, to form a top, an attaching flange formed at the rear edges of the side walls, the lower edges of the side walls being bent to form opposed channels, a bottom forming plate slidable between the channels, a front wall extending upwardly from the forward edge portion of the removable bottom forming plate, an inwardly directed flange formed at the edge portions of the front wall for engagement with the inner faces of the sides and top of the casing.

4. In an electric meter protector, a casing comprising a pair of side walls, the upper edge portions thereof being curved inwardly and hingedly secured together to form a top, the rear edges of the side walls being disposed inwardly to form an attaching flange, the lower edges of the side walls being bent to form opposed guide channels, a bottom forming plate slidable between said channels, a front wall extending upwardly from the forward edge portion of the bottom forming plate, an inwardly directed flange formed at the edge of the front wall for engagement with the inner faces of the sides and top of the casing, removable lining pads for the inner faces of the sides and top of the casing, guides for receiving said pads, and additional lining pads for the bottom forming plate and the front wall.

In testimony whereof I affix my signature.

ADAM H. GROSZ.